Sept. 28, 1948.  G. W. McCARTY  2,450,053
PNEUMATIC GRAIN CONVEYER
Filed Sept. 8, 1945  2 Sheets-Sheet 1
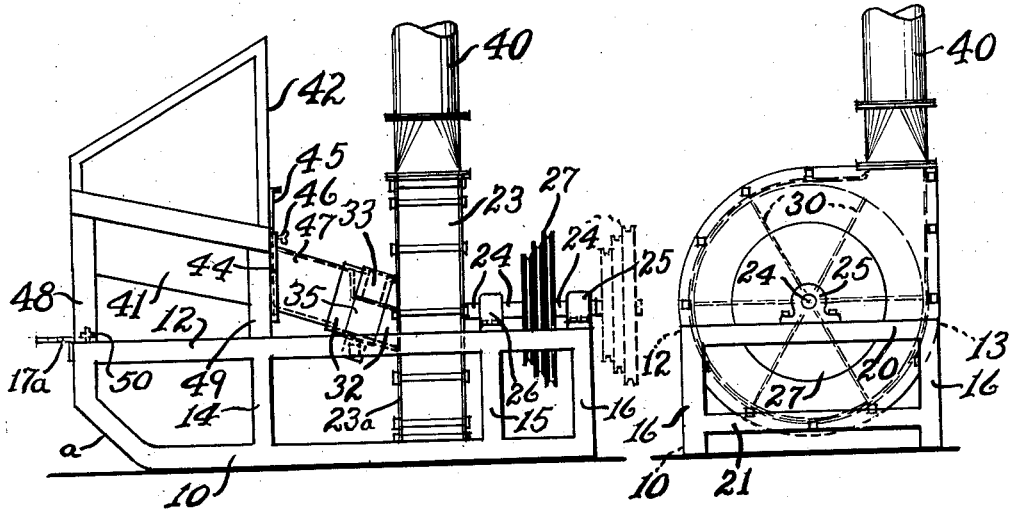
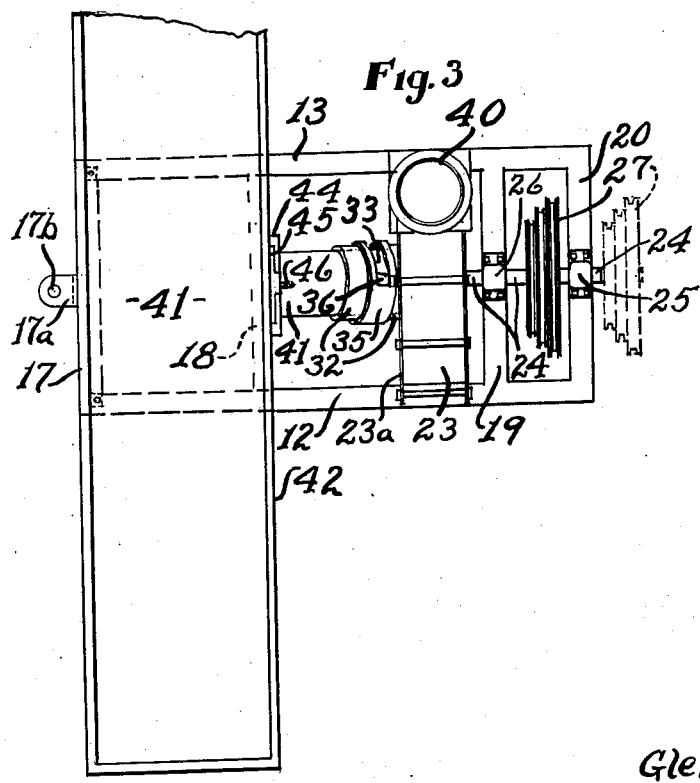
INVENTOR.
Glenn W. McCarty
BY
M. Y. Charles
ATTORNEY.

Sept. 28, 1948. G. W. McCARTY 2,450,053
PNEUMATIC GRAIN CONVEYER
Filed Sept. 8, 1945 2 Sheets-Sheet 2
Fig. 4
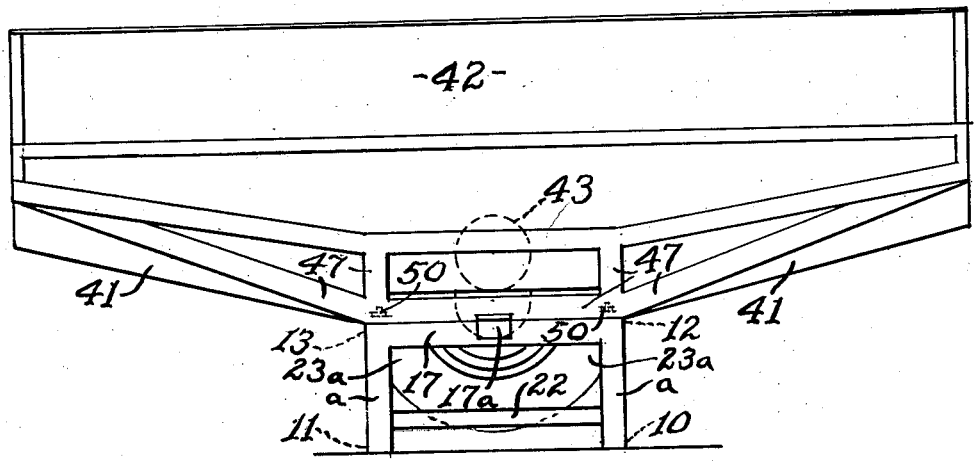
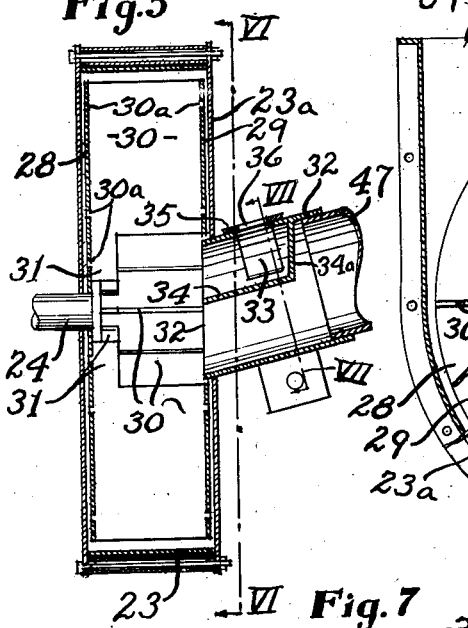
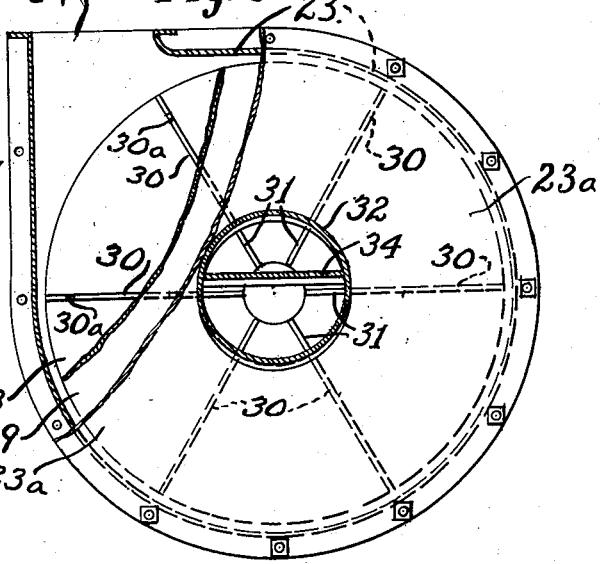
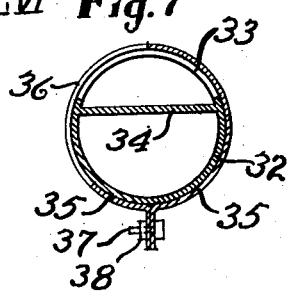
INVENTOR.
Glenn W. McCarty
BY
M. Y. Charles
ATTORNEY.

Patented Sept. 28, 1948

2,450,053

UNITED STATES PATENT OFFICE 2,450,053

PNEUMATIC GRAIN CONVEYER

Glenn W. McCarty, Wichita, Kans.

Application September 8, 1945, Serial No. 615,131

1 Claim. (Cl. 302—37)

My invention relates to an improvement in pneumatic grain conveyers. The object of my invention is to provide a device of the kind mentioned that will move grain speedily and without cracking or breaking the grain during its transit through the conveyer.

A further object is to provide a device of the kind mentioned that is provided wth a large hopper whereby a large quantity of grain, probably as much as a truck load, can be dumped at a time so as to release the truck for immediate use, and the conveyer will move that amount of grain in a comparatively short time.

Another object is to provide a device of the kind mentioned that has a control between the hopper and the blower whereby the amount of grain per minute allowed to pass from the hopper to and through the blower may be controlled to suit the operator of the machine.

A still further object is to provide a machine of the kind mentioned that is portable, and this hopper is easily and quickly removable from the machine so that the machine may be easily moved through narrow passages and gates and the like.

A still further object is to provide a device of the kind mentioned that is light in weight, one that is strong, durable and long lived as well as one that is simple in construction and simple to operate.

A still further object is to provide a device of the kind mentioned in which both the flow of the grain and the flow of air taken in by the blower may be controlled and adjusted independent of each other so that proper amounts of grain and air may be simultaneously admitted to the machine to obtain the best grain moving results.

A still further object is to provide a device of the kind mentioned that is ideal for ventilating all types of grain and hay crops to help them dry in bins, and to reduce the danger of spoilage and loss due to spontaneous combustion.

A further object is to provide a machine of the kind mentioned in which the front of the hopper is low enough that a loaded truck or wagon bed may be backed over the hopper so as to make it easy to unload the grain from the truck or wagon into the hopper. These and other objects will be more fully described as this description progresses.

Now referring to the accompanying drawings in which similar numerals of reference designate the same parts throughout the several figures of the drawings, Fig. 1 is a side view of the machine.

Fig. 2 is a rear end view of the machine, the hopper being removed.

Fig. 3 is a top plan view of the machine shown in Fig. 1.

Fig. 4 is a front view of the machine.

Fig. 5 is a vertical detail sectional view through the blower.

Fig. 6 is a detail sectional and side view of the blower, the view being taken along the line VI—VI in Fig. 5 and looking in the direction of the arrows, and parts of the blower are broken away for convenience of illustration.

Fig. 7 is a detail sectional view through the grain and air feed pipe to the blower, the view being taken along the line VII—VII in Fig. 5 and looking in the direction of the arrows.

In the drawings is shown a frame work having two sled runner like elements 10 and 11 that are parallelly spaced apart and the front ends of which are sloped upwardly as at a. Above the sled runner like elements 10 and 11 respectively are frame elements 12 and 13. The front ends of the frame elements 12 and 13 are welded to the front ends of their respective sled runner like elements 10 and 11. The rear portions of the frame elements 12 and 13 are supported on stud like elements 14, 15 and 16 that are positioned between each sled runner like element 10 and 11 and its respective frame element 12 and 13 and the ends of the studs 14, 15 and 16 are welded to their respective sled runner like element 10 or 11 and its corresponding frame element 12 or 13. The frame elements 12 and 13 are joined together by cross bars 17, 18, 19 and 20 and the standards 14 and 16 are joined together by the cross members 21 and 22, the ends of the cross members 17, 18, 19 and 20 are welded to the frame members 12 and 13 and the ends of the cross member 22 are welded to the studs 14 and the cross member 21 is welded to the studs 16. At the center of the cross member 17 is an angle element 17a, one leg of which is welded thereto and the other leg of which is provided with a hole 17b. This element may be used as a hitch by which the machine may be pulled or moved with a tractor or any other suitable source of power.

A blower housing 23 is positioned crossways and between the frame members 12 and 13 and is rigidly supported thereon.

In the blower housing 23 is a rotor that is rigidly carried on a shaft 24 that is revolvably carried in bearings 25 and 26 that are rigidly mounted on the cross members 19 and 20. Rigidly mounted on the shaft 24 is a pulley 27 which may be any desired pulley such as a step pulley for V-belts or a flat pulley for a flat belt.

The rotor in the rotor housing 23 comprises a circular plate 28 that is rigidly mounted on the drive shaft 24 and a second circular plate 29 having a circular opening in the center thereof and between the plates 28 and 29 is a series of radially positioned plates 30, the side edges of which are provided with outwardly projecting pins 30a that pass through the circular plates 28 and 29 and are riveted as a means of rigidly assembling the rotor, the inner end of each plate 30 is provided with an extension end 31 that extends toward the center of the rotor to a point adjacent the drive shaft 24, and the opposite edges of the plates 30 will just clear the inner end of an intake tube 32 that is integrally formed on the side wall 23a of the blower housing 23, the intake tube 32 is in a downwardly sloping position to the center of the blower 23. The top of the intake tube 32 is provided with an opening 33 below which and in the tube 32 is a dividing wall 34, the rear end of which slopes upwardly as at 34a to meet the top of the tube 32.

Around the tube 32 is positioned a band 35 having a slot 36 therein that will register with the opening 33 in the tube 32. The ends of the band 35 are turned outwardly and a bolt 37 is passed therethrough and a nut 38 is threaded thereon to rigidly bind the band 35 in adjusted positions on the tube 32. The blower housing 23 is provided with an upwardly directed discharge opening 39 over which is positioned a discharge tube 40 through which the grain and discharge of the blower may be conveyed to any desired place such as a bin or a freight car and the like.

The machine is provided with an open top hopper having a bottom 41 that slopes downwardly from the outer ends of the hopper and rearwardly from the front of the hopper to a central point at the bottom of the vertically positioned rear wall 42 of the hopper where there is a discharge opening 43 from the hopper. Over the opening 43 is a frame 44 having a slide plate 45 therein that is adapted to be slid up and down to open and close the opening 43 from the hopper. The frame 44 is provided with a winged set screw 46 which may be screwed against the side plate 45 to hold it in adjusted positions over the opening 43 so as to govern the flow of grain from the hopper. The frame 44 is provided with a downwardly sloping tube 47 that will slide into the tube 32 of the blower 23. The hopper is supported on frame members 48 and 49 that rest on the cross frame members 17 and 18 and is held thereon by means of bolts 50 that pass through the frame members.

The operation of the device is as follows: The pulley 27 may be driven from the power take off of a tractor or by specially provided motor or engine, the pulley 27 will drive the shaft 24 to revolve the rotor 28—29—30 which will draw air in through the air opening 33 in the tube and discharge it through the discharge opening 39 and the discharge tube 40.

A truck or wagon containing the grain may be backed up to the hopper with the end thereof extending over the front edge of the hopper whereupon the tail gate may be removed from the truck or wagon and the grain may be allowed to flow or be scooped from the truck or wagon into the hopper whereupon the truck is released for immediate further use. This having been done, the slide plate 45 may be raised to allow the desired amount of grain to flow from the hopper through the tubes 47 and 32 into the cavity of the blower housing 23 where the grain will fall into the stream of air coming from the air opening 33 at approximately the center of the rotor where the feet per second of travel of the rotor blades 30 is much less than that at the outer ends of the rotor blades 30; therefore, the blades 30 do not strike the grain with force enough to crack or break the grain and by the time the grain flows to the outer ends of the blades 30 the draft of air being moved by the blades 30 will pass out through the discharge opening 39 and tube 40 and carry the grain with it, thus it is seen that the grain actually contacts very little of the rotor and housing as it passes through the blower, therefore there is no cracking or breaking of the grain.

The amount of air employed in carrying the grain through the blower is determined by the amount and weight of the grain being moved by the machine. The adjustment of the air is obtained by loosening the nut 38 on the bolt 37 and revolving the band 35 on the tube 32 so that the opening 33 may be increased or decreased in size to admit the desired amount of air, or if desired, the band 35 may be revolved to entirely close the opening 33 and then slipped longitudinally on the tube 32 to open the desired portion of the opening 33, and this adjustment having been made, the nut 38 may again be tightened on the bolt 37 on the band 35 into its adjusted position.

Such modifications of the invention may be employed as lie within the scope of the appended claim without departing from the spirit or intention of the invention. Now having fully shown and described my invention, what I claim is:

In a pneumatic grain conveyer machine of the kind described; said machine having a centrifugal blower and a grain hopper, tubular means connecting between the inlet of the blower and the outlet of the hopper, said tubular means sloping downwardly from the hopper to the blower so as to convey grain by gravity from the hopper into the interior of the blower, said tubular means having a portion therein to form a compartment in the tubular means, one end of said compartment being open and communicating with the intake opening of the blower, and the compartment being provided with an inlet opening, and means revolvable and movable longitudinally on the tubular means for adjusting the size, shape, and location of the air intake opening into the said compartment, said blower having a discharge opening therefrom, and a rotor therein, said rotor being carried on a rotatable shaft that is carried in bearings that are separate from the blower, and means on said shaft for the rotary driving of the shaft and rotor.

GLENN W. McCARTY.

REFERENCES CITED

The following references are of record in the file of this patent:

UNITED STATES PATENTS

| Number | Name | Date |
|---|---|---|
| 707,992 | Warner | Aug. 26, 1902 |
| 973,495 | Fritz et al. | Oct. 25, 1910 |
| 1,034,961 | Birkenkamp | Aug. 6, 1912 |
| 1,500,581 | Filson | July 8, 1924 |
| 1,535,363 | Wallace | Apr. 28, 1925 |
| 1,900,213 | Wenberg | Mar. 7, 1933 |
| 2,394,058 | Hitchcock et al. | Feb. 5, 1946 |